United States Patent
Yun et al.

(10) Patent No.: US 12,522,057 B2
(45) Date of Patent: Jan. 13, 2026

(54) DOOR CONNECTING DEVICE FOR VEHICLE

(71) Applicants: Hyundai Motor Company, Seoul (KR); Kia Corporation, Seoul (KR)

(72) Inventors: Hyungin Yun, Seoul (KR); Chungsik Yim, Anyang-Si (KR)

(73) Assignees: Hyundai Motor company, Seoul (KR); Kia Corporation, Seoul (KR)

(*) Notice: Subject to any disclaimer, the term of this patent is extended or adjusted under 35 U.S.C. 154(b) by 479 days.

(21) Appl. No.: 17/980,375

(22) Filed: Nov. 3, 2022

(65) Prior Publication Data

US 2023/0322055 A1   Oct. 12, 2023

(30) Foreign Application Priority Data

Apr. 7, 2022 (KR) .................. 10-2022-0043387

(51) Int. Cl.
| | |
|---|---|
| *B60J 5/04* | (2006.01) |
| *E05B 77/38* | (2014.01) |
| *E05F 7/04* | (2006.01) |

(52) U.S. Cl.
CPC ............ *B60J 5/0479* (2013.01); *E05B 77/38* (2013.01); *E05F 7/04* (2013.01); *B60J 2005/0475* (2013.01)

(58) Field of Classification Search
CPC ...... B60J 5/0451; B60J 5/0458; B60J 5/0479; B60J 2005/0475; E05B 77/38; E05B 83/38; E05B 2015/485; E05F 7/04

USPC ........................................................ 296/146.9
See application file for complete search history.

(56) References Cited

U.S. PATENT DOCUMENTS

| | | | |
|---|---|---|---|
| 2002/0027375 A1* | 3/2002 | Wattebled | E05B 83/40 296/146.1 |
| 2002/0073623 A1* | 6/2002 | Sakamoto | B60J 5/0479 49/366 |
| 2012/0193938 A1* | 8/2012 | Krajenke | B60J 5/0479 296/146.7 |
| 2020/0338971 A1* | 10/2020 | Ma | B60J 10/86 |
| 2020/0378171 A1* | 12/2020 | Reiter | E05D 11/0054 |
| 2020/0399938 A1* | 12/2020 | Min | E05B 83/38 |
| 2023/0322054 A1* | 10/2023 | Yun | E05F 7/04 |
| 2023/0322055 A1* | 10/2023 | Yun | E05F 7/00 |

* cited by examiner

*Primary Examiner* — Gregory A Blankenship
(74) *Attorney, Agent, or Firm* — Morgan Lewis & Bockius LLP

(57) ABSTRACT

A door connecting device for a vehicle to which opposite swing doors including a rear door and a front door is applied, the opposite swing doors being configured to be opened or closed by a relative movement between the rear door and the front door, includes a damper disposed on one of the front door and the rear door and configured to move forward or rearward while coming into contact with an end portion of the other of the rear door and the front door when the rear door and the front door are closed; a stopper disposed on the one of the front door and the rear door and configured to be moved forward or rearward by a forward movement or a rearward movement of the damper; and a lever connecting the damper and the stopper and configured to mediate a forward movement or a rearward movement of the stopper when the damper moves forward or rearward thereof.

12 Claims, 4 Drawing Sheets

DOOR CONNECTING DEVICE FOR VEHICLE

CROSS-REFERENCE TO RELATED APPLICATION

The present application claims priority to Korean Patent Application No. 10-2022-0043387 filed on Apr. 7, 2022, the entire contents of which is incorporated herein for all purposes by this reference.

BACKGROUND OF THE PRESENT DISCLOSURE

Field of the Present Disclosure

The present disclosure relates to a door connecting device for a vehicle, and more particularly, to a door connecting device that connects a front door and a rear door of a vehicle to which opposite swing doors are applied without a B-pillar.

Description of Related Art

In general, a door for a vehicle separates the inside and outside of the vehicle and performs important functions of blocking external noise, rainwater, dust, wind, and the like and safely protecting an occupant by absorbing impact together with a side structure in the event of a broadside collision.

There are various types of doors for a vehicle including doors for special purposes. However, hinge type swing doors are widely used for passenger vehicles.

Typically, the swing door refers to a door which is opened toward the outside of a vehicle body about a hinge shaft provided by a hinge bracket disposed between the swing door and the vehicle body. The advantage of the swing door is that the swing door is easily opened or closed and has a simple structure, which makes it easy to maintain and repair the swing door.

Meanwhile, opposite swing doors are applied to some vehicles. The opposite swing doors provide wide openness when opened and make it easy for the occupant to get in or out of the vehicle. The opposite swing doors are classified into a type having no B pillar and a type having the B pillar.

FIG. 1 is a side view exemplarily illustrating a vehicle 1 to which opposite swing doors are applied with a B-pillar in the related art. Referring to FIG. 1, a front upper latch 4 and a front lower latch 5 are respectively provided at upper and lower sides of a front door 2 to maintain a state of being locked to the B-pillar. A rear lower latch 6 is provided at a lower side of a rear door 3 to maintain a state of being locked to the B-pillar.

In case of the vehicle to which the opposite swing doors are applied with the B-pillar as described above, the doors 2 and 3 may be kept locked to the B-pillar only by the latches 4, 5, and 6 provided at the upper and lower sides of the front door and the rear door 2 and 3, and thus there occurs no problem of sagging of the doors or the separation between the doors. However, in case of a vehicle to which opposite swing doors are applied without a B-pillar nor a latch structure, there is no structure for connecting a front door and a rear door. For the present reason, there is a problem in that the front door and the rear door sag or are separated when a load exceeding strength of a ceiling or strength of a side door is excessively applied.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door connecting device that connects a front door and a rear door of a vehicle to which opposite swing doors are applied without a B-pillar.

Various aspects of the present disclosure are directed to providing a door connecting device for a vehicle to which opposite swing doors including a rear door and a front door is applied, the opposite swing doors being configured to be opened or closed by a relative movement between the rear door and the front door, the door connecting device including: a damper disposed on one of the front door and the rear door and configured to move forward or rearward while coming into contact with an end portion of the other of the rear door and the front door when the rear door and the front door are closed; a stopper disposed on the one of the front door and the rear door and configured to be moved forward or rearward by a forward movement or a rearward movement of the damper; and a lever connecting the damper and the stopper and configured to mediate a forward movement or a rearward movement of the stopper when the damper moves forward or rearward thereof.

When the rear door and the front door are opened, one end portion of the damper may protrude toward the front door, and a second end portion of the damper may be connected to one end portion of the lever.

When the rear door and the front door are closed, the damper may operate so that the first end portion of the damper comes into contact with an end portion of the front door and is retracted toward the rear door.

An elastic member may be disposed on the damper and provided between a first end portion and a second end portion of the damper, and the elastic member may provide an elastic force to allow the first end portion of the damper to protrude toward the front door when the rear door and the front door are opened.

The elastic member may be a coil spring wound around a shaft of the damper.

The damper, the stopper, and the lever may be accommodated in a casing opened at one side thereof, and the damper and the stopper may move forward or rearward through the open side of the casing.

When the damper moves toward the rear door, the damper may push one end portion of the lever, the other end portion of the lever may move toward the front door, and the stopper connected to the other end portion of the lever may move toward the front door.

The lever may be configured to rotate about a rotation shaft disposed between the first end portion and the second end portion of the lever.

When the rear door and the front door are closed, one end portion of the stopper may be inserted into an insertion hole provided at an end portion of the front door.

A reinforcement may be disposed inside the insertion hole and support one end portion of the stopper.

The front door may include a front internal panel disposed inside the vehicle, and a front external panel disposed outside the vehicle, and the insertion hole may be defined by the front internal panel and the front external panel.

The rear door may include a rear internal panel disposed inside the vehicle, and a rear external panel disposed outside the vehicle, and the damper, the stopper, and the lever may be disposed in a space between the rear internal panel and the rear external panel.

The damper and the stopper may be provided at an end portion of the rear door, and the damper may be disposed above the stopper.

According to the exemplary embodiment of the present disclosure, the structure for connecting the front door and the rear door is adopted to eliminate a structural limitation of the vehicle to which the opposite swing doors are applied without a B-pillar. Therefore, even though a load exceeding strength of the ceiling or strength of the side door is applied, it is possible to prevent the front door and the rear door from sagging and being excessively separated and meet regulations related to the strength of the ceiling and side door.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
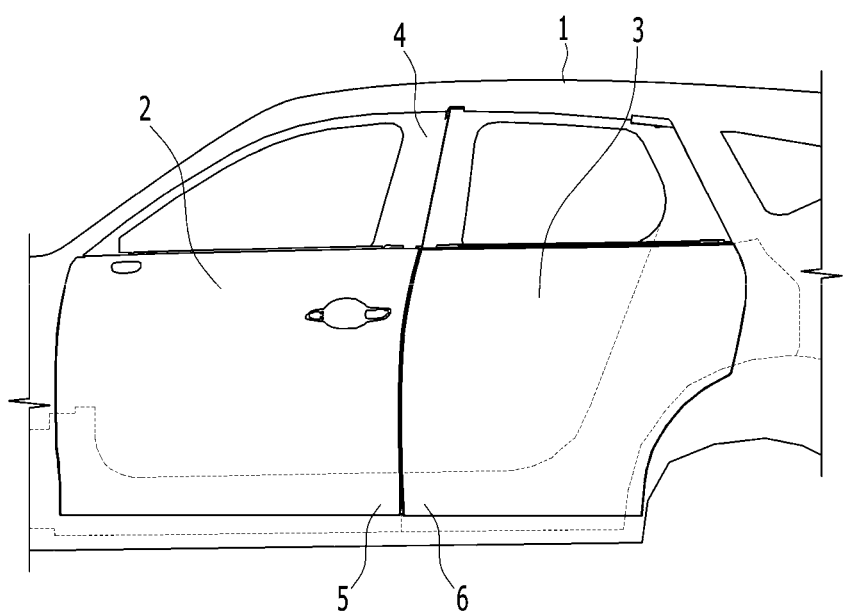
FIG. 1 is a side view exemplarily illustrating a vehicle to which opposite swing doors are applied with a B-pillar in the related art.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to a same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings so that those with ordinary skill in the art to which an exemplary embodiment of the present disclosure pertains may easily carry out the embodiments. The present disclosure may be implemented in various different ways and is not limited to the exemplary embodiments described herein.

Furthermore, the constituent elements including a same configurations in the several embodiments will be assigned with a same reference numerals and described only in the representative embodiment, and only the constituent elements, which are different from the constituent elements according to the representative embodiment, will be described in other exemplary embodiments of the present disclosure.

It is noted that the drawings are schematic and are not illustrated based on actual scales. Relative dimensions and proportions of parts illustrated in the drawings are exaggerated or reduced in size for clarity and convenience in the drawings, and any dimension is just illustrative but not restrictive. The same reference numerals designate the same structures, elements or components illustrated in two or more drawings in order to exhibit similar characteristics. When one component is described as being positioned "above" or "on" another component, one component can be positioned "directly on" another component, and one component can also be positioned on another component with other components interposed therebetween.

The exemplary embodiment of the present disclosure specifically illustrates an example of the present disclosure. As a result, various modifications of the drawings are expected. Therefore, the exemplary embodiments are not limited to specific forms in regions illustrated in the drawings, and for example, include modifications of forms by the manufacture thereof.

Hereinafter, a door connecting device for a vehicle according to various exemplary embodiments of the present disclosure will be described in detail with reference to the accompanying drawings.

Figure 2:
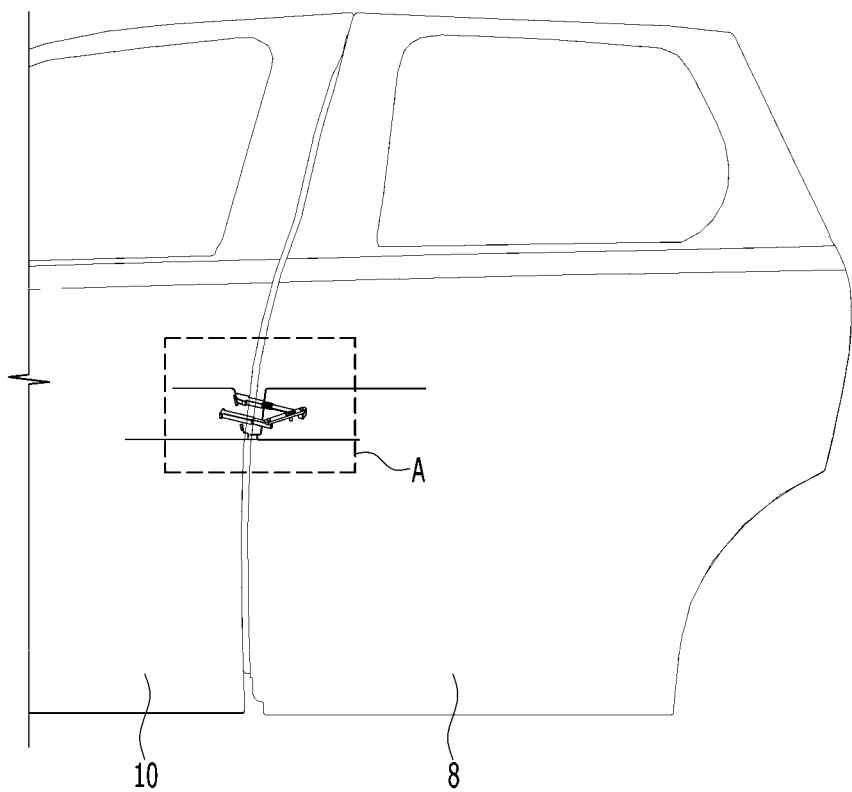
FIG. 2 is a side view exemplarily illustrating a vehicle to which a door connecting device for a vehicle according to the exemplary embodiment of the present disclosure is applied.
Figure 3:
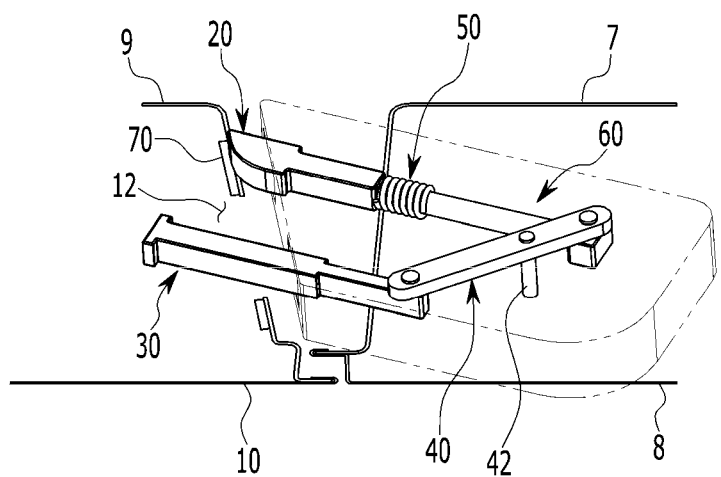
FIG. 3 is a view exemplarily illustrating a state of the door connecting device for a vehicle according to the exemplary embodiment of the present disclosure when a rear door is closed.
Figure 4:
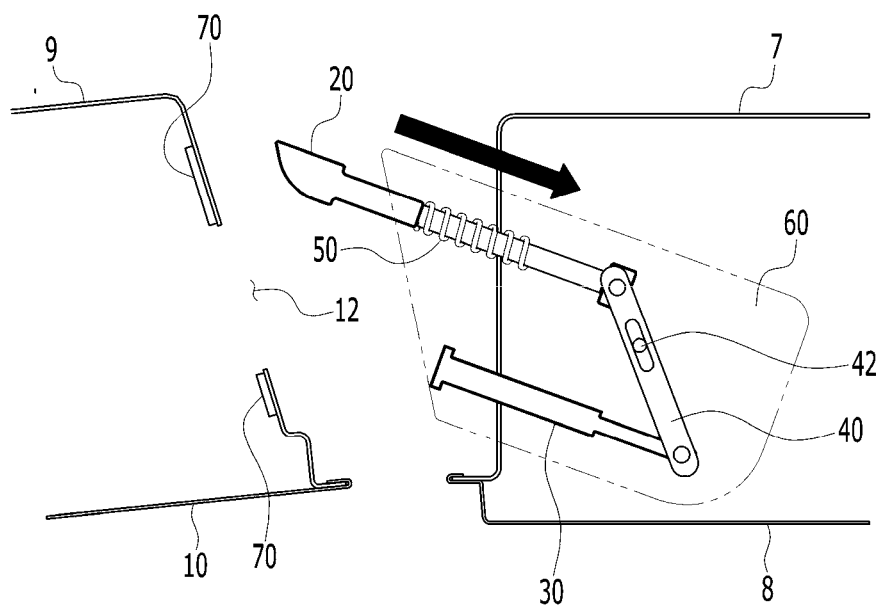
FIG. 4 is a view exemplarily illustrating a state of the door connecting device for a vehicle according to the exemplary embodiment of the present disclosure when the rear door is opened.

FIG. 2 is a side view exemplarily illustrating a vehicle to which a door connecting device for a vehicle according to the exemplary embodiment of the present disclosure is applied, FIG. 3 is a view exemplarily illustrating a state of the door connecting device for a vehicle according to the exemplary embodiment of the present disclosure when a rear door is closed, and FIG. 4 is a view exemplarily illustrating a state of the door connecting device for a vehicle according to the exemplary embodiment of the present disclosure when the rear door is opened.

Referring to FIG. 2, a door connecting device for a vehicle according to various exemplary embodiments of the present disclosure may be applied to a structure configured to connect a rear door 8 and a front door 10 and provided at a center portion, i.e., part 'A' between the rear door 8 provided at a rear side and the front door 10 provided at a front side based on a longitudinal direction of a vehicle. Furthermore, the door connecting device may be applied to the structure in which the rear door 8 is opened or closed while moving in a direction toward the inside or outside of the vehicle and sliding forward or rearward in the longitudinal direction of the vehicle.

Referring to FIG. 3 and FIG. 4, a door connecting device for a vehicle according to various exemplary embodiments of the present disclosure is applied to a vehicle including opposite swing doors including a rear door 7 and 8 and a front door 9 and 10 and configured to be opened or closed as the rear door 7 and 8 and the front door 9 and 10 move relative to each other. The door connecting device includes a damper 20, a stopper 30, and a lever 40.

The configuration has been described in which the door connecting device for a vehicle according to the exemplary embodiment of the present disclosure is applied to the rear door 7 and 8, but the present disclosure is not limited thereto. The door connecting device may be applied to the front door 9 and 10.

First, the front door 9 and 10 may include a front internal panel 9 disposed inside the vehicle, and a front external panel 10 disposed outside the vehicle. An insertion hole 12 is formed between the front internal panel 9 and the front external panel 10. Furthermore, the rear door 7 and 8 may include a rear internal panel 7 disposed inside the vehicle, and a rear external panel 8 disposed outside the vehicle.

The damper 20 is provided on the rear door 7 and 8. The damper 20 may move forward toward the front door 9 and 10 or move rearward therefrom when the rear door 7 and 8 and the front door 9 and 10 are opened or closed.

The lever 40 may connect the damper 20 and the stopper 30 and are configured to mediate a forward movement or a rearward movement of the stopper 30 when the damper 20 moves forward or rearward thereof.

Meanwhile, the damper 20, the stopper 30, and the lever 40 may be accommodated in a casing 60 opened at the one side thereof. The damper 20 and the stopper 30 may move forward or rearward through the open side of the casing 60.

As illustrated in FIG. 3, when the rear door 7 and 8 and the front door 9 and 10 are closed, one end portion of the damper 20 comes into contact with an end portion of the front door internal panel 9, and the other end portion of the damper 20 is retracted toward the rear door 7 and 8.

An elastic member 50 may be disposed on the damper 20 and provided between a first end portion and a second end portion of the damper 20. The elastic member 50 may provide an elastic force that allows one end portion of the damper 20 to protrude toward the front door 9 and 10 when the rear door 7 and 8 and the front door 9 and 10 are opened. In the instant case, the elastic member 50 may be a coil spring wound around a shaft of the damper 20.

When the rear door 7 and 8 and the front door 9 and 10 are closed, one end portion of the damper 20 comes into contact with the end portion of the front door 9 and 10 so that a compressive force is applied to the elastic member 50.

As illustrated in FIG. 4, when the rear door 7 and 8 and the front door 9 and 10 are opened, one end portion of the damper 20 may protrude toward the front door 9 and 10, and the other end portion of the damper 20 may be connected to one end portion of the lever 40. In the instant case, one end portion of the damper 20 is not in contact with the end portion of the front door 9 and 10, no compressive force is applied to the elastic member 50.

The stopper 30 may be disposed on the rear door 7 and 8 and moved forward or rearward by the forward or rearward movement of the damper 20. The other end portion of the damper 20 and one end portion of the stopper 30 are rotatably connected to two opposite end portions of the lever 40, respectively. The lever 40 may rotate about a rotation shaft 42 provided between one end portion and the other end portion of the lever 40.

As illustrated in FIG. 3, when the door is closed, the damper 20 pushes one end portion of the lever 40 while moving toward the rear door 7 and 8, and the lever 40 rotates so that the other end portion of the lever 40 moves toward the front door 9 and 10, and the stopper 30 connected to the other end portion of the lever 40 moves toward the front door 9 and 10. In the instant case, one end portion of the stopper 30 may be inserted into the insertion hole 12 provided at the end portion of the front door 9 and 10. A reinforcement 70 may be provided in the insertion hole 12, i.e., disposed on an internal surface of the front internal panel 9 and an internal surface of the front external panel 10.

Because the reinforcement 70 is provided in the insertion hole 12 of the front door 9 and 10, the stopper 30 is caught by the reinforcement 70 when a load is applied by an external force in a direction in which the front door 9 and 10 and the rear door 7 and 8 are separated. Therefore, it is possible to prevent the front door 9 and 10 and the rear door 7 and 8 from being excessively separated and resist against the external force. Therefore, it is possible to meet regulations related to the strength of the side door and ceiling.

As illustrated in FIG. 4, when the door is opened, the damper 20 is moved toward the front door 9 and 10 by the elastic force of the elastic member 50, and one end portion of the lever 40 connected to the other end portion of the damper 20 is moved toward the front door 9 and 10. In the instant case, the lever 40 rotates so that the other end portion of the lever 40 moves toward the rear door 7 and 8. Furthermore, the stopper 30 connected to the other end portion of the lever 40 moves toward the rear door 7 and 8 so that the stopper 30 separates from the insertion hole 12.

Meanwhile, the damper 20, the stopper 30, and the lever 40 may be disposed in a space between the rear internal panel 7 and the rear external panel 8. Furthermore, the damper 20 and the stopper 30 may be disposed at the end portion of the rear door 7 and 8, and the damper 20 may be disposed above the stopper 30.

As described above, according to the exemplary embodiment of the present disclosure, the structure for connecting the front door and the rear door is adopted to eliminate a structural limitation of the vehicle to which the opposite swing doors are applied without a B-pillar. Therefore, even though a load exceeding strength of the ceiling or strength of the side door is applied, it is possible to prevent the front door and the rear door from sagging and being excessively separated and meet regulations related to the strength of the ceiling and side door.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door connecting apparatus for a vehicle to which opposite swing doors including a rear door and a front door is applied, the opposite swing doors being configured to be opened or closed by a relative movement between the rear door and the front door, the door connecting apparatus comprising:
- a damper disposed on one of the front door and the rear door and configured to move forward or rearward while coming into contact with an end portion of the other of the rear door and the front door when the rear door and the front door are closed;
- a stopper disposed on the one of the front door and the rear door and configured to be moved forward or rearward by a forward movement or a rearward movement of the damper; and
- a lever connecting the damper and the stopper and configured to mediate a forward movement or a rearward movement of the stopper when the damper moves forward or rearward thereof,
- wherein when the rear door and the front door are opened, a first end portion of the damper protrudes toward the other of the front door and the rear door, and a second end portion of the damper is connected to one end portion of the lever, and
- wherein when the rear door and the front door are closed, the damper operates so that the first end portion of the damper comes into contact with an end portion of the other of the front door and the rear door and is retracted toward the one of the front door and the rear door.

2. The door connecting apparatus of claim 1,
wherein an elastic member is disposed on the damper and provided between a first end portion and a second end portion of the damper, and
wherein the elastic member provides an elastic force to allow the first end portion of the damper to protrude toward the other of the front door and the rear door when the rear door and the front door are opened.

3. The door connecting apparatus of claim 2, wherein the elastic member is a coil spring wound around a shaft of the damper.

4. The door connecting apparatus of claim 1, wherein the damper, the stopper, and the lever are accommodated in a casing opened at one side thereof, and the damper and the stopper move forward or rearward through the open side of the casing.

5. The door connecting apparatus of claim 1,
wherein when the damper moves toward the one of the front door and the rear door, the damper pushes a first end portion of the lever, and a second end portion of the lever moves toward the other of the front door and the rear door, and
wherein a first end portion of the stopper connected to the second end portion of the lever moves toward the other of the front door and the rear door.

6. The door connecting apparatus of claim 5, wherein the damper is pivotally connected to the first end portion of the lever and the second end portion of the lever is pivotally connected to the first end portion of the stopper.

7. The door connecting apparatus of claim 5, wherein the lever is configured to rotate about a rotation shaft mounted between the first end portion and the second end portion of the lever.

8. The door connecting apparatus of claim 1, wherein when the rear door and the front door are closed, one end portion of the stopper is inserted into an insertion hole disposed at an end portion of the other of the front door and the rear door.

9. The door connecting apparatus of claim 8, wherein a reinforcement is disposed inside the insertion hole and supports the one end portion of the stopper.

10. The door connecting apparatus of claim 9, wherein the front door includes a front internal panel disposed inside the vehicle, and a front external panel disposed outside the vehicle, and the insertion hole is defined by the front internal panel and the front external panel.

11. The door connecting apparatus of claim 1,
wherein the rear door includes a rear internal panel disposed inside the vehicle, and a rear external panel disposed outside the vehicle, and
wherein the damper, the stopper, and the lever are disposed in a space between the rear internal panel and the rear external panel.

12. The door connecting apparatus of claim 1,
wherein the damper and the stopper are provided at an end portion of the rear door, and
wherein the damper is disposed above the stopper.

* * * * *